United States Patent [19]

Tamori et al.

[11] 4,227,160
[45] Oct. 7, 1980

[54] TRANSVERSAL TYPE AUTOMATIC EQUALIZER

[75] Inventors: Michitoshi Tamori; Katsuhiko Furuya, both of Tokyo; Hidetaka Yanagidaira, Omiya; Hiroshi Sakaki, Tokyo, all of Japan

[73] Assignee: Kokusai Denshin Denwa Co., Ltd., Tokyo, Japan

[21] Appl. No.: 969,364

[22] Filed: Dec. 14, 1978

[30] Foreign Application Priority Data

Dec. 26, 1977 [JP] Japan ................... 52-155612

[51] Int. Cl.³ ........................... H04B 3/04
[52] U.S. Cl. .................. 333/18; 364/724; 375/13
[58] Field of Search .......... 333/18, 166; 325/42; 364/718, 724, 733

[56] References Cited

U.S. PATENT DOCUMENTS

| 3,829,798 | 8/1974 | Byram et al. | 333/166 |
| 3,992,616 | 11/1976 | Acker | 333/18 X |
| 4,125,899 | 11/1978 | Kawai et al. | 333/18 X |

Primary Examiner—Paul L. Gensler
Attorney, Agent, or Firm—Armstrong, Nikaido, Marmelstein & Kubovcik

[57] ABSTRACT

A transversal type automatic equalizer comprises a transversal filter having a plurality of taps separated by time delay intervals, said transversal filter receiving input signals from a transmission line, a plurality of potentiometers being connected to each of said taps to provide a tap weight and the outputs of the potentiometers being summed up to provide an equalized output signal, and said potentiometers being adjusted by an equalization arithmetic unit. The potentiometers and thereby the tap weights are adjusted according to the output of the arithmetic unit whereby an equalized output with a suppressed ripple characteristic is produced.

3 Claims, 6 Drawing Figures

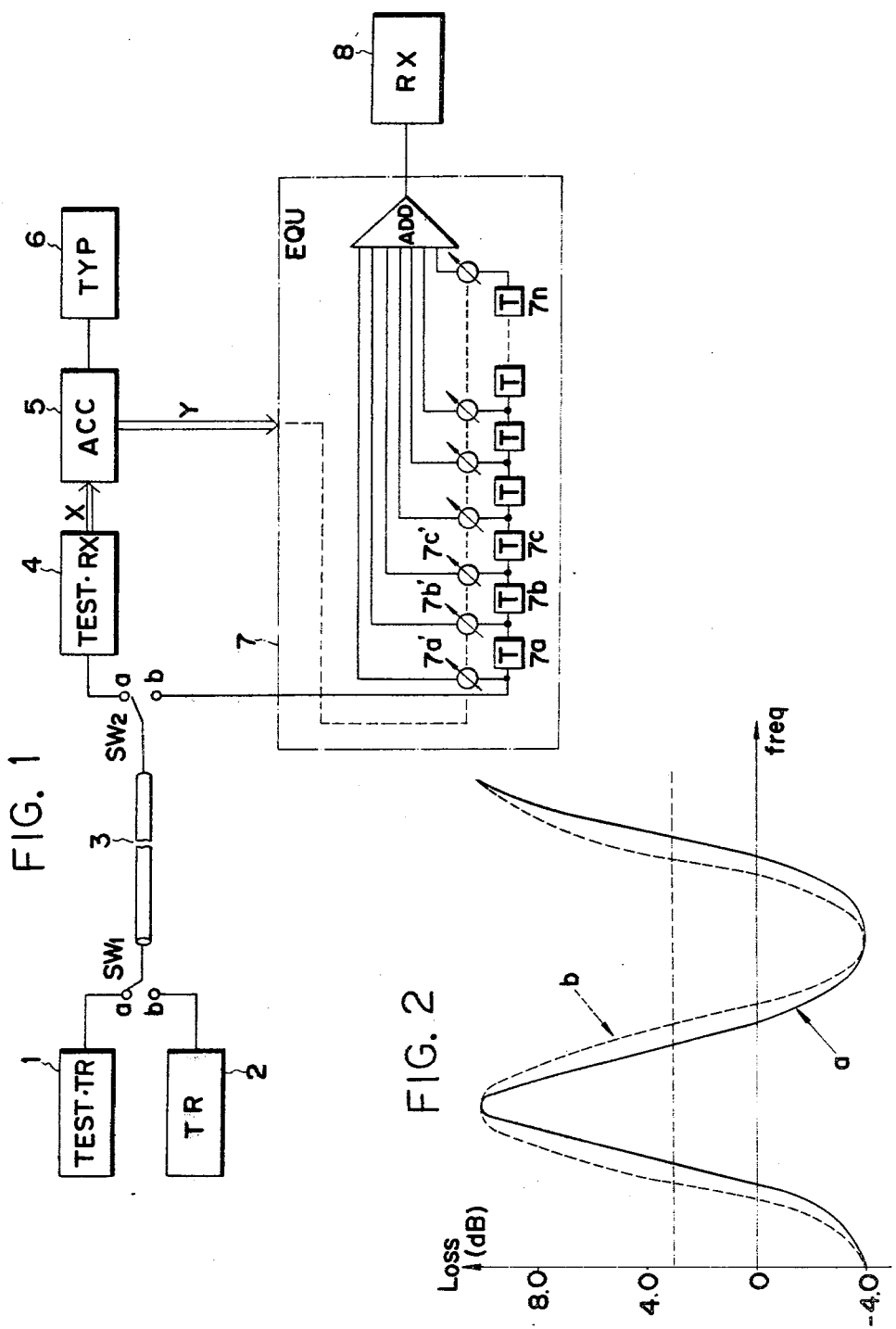

TRANSVERSAL TYPE AUTOMATIC EQUALIZER

BACKGROUND OF THE INVENTION

The present invention relates to an automatic equalizer for a digital transmission line using a transversal equalizer, in particular, relates to an automatic equalizer wherein the desired equalization characteristic is obtained utilizing the amplitude level of the cosine component based upon the measurement result on the frequency axis of the transmission line. According to the present invention, an automatic equalizer which provides the desired amplitude equalization and/or delay equalization is obtained utilizing the result of discrete measurement of the amplitude characteristic obtained in dB(decibel) on the frequency axis and a delay characteristic obtained in msec(millisecond) or $\mu$sec(micro second).

In a prior art device, the characteristics of a transmission line are obtained first, and then the inverted characteristics are obtained as the response of the Discrete Fourier Transform on the time axis, and the result is utilized as a tap weight of a transversal equalizer or filter. However, although the result of measurements concerning the amplitude characteristic obtained from a prior measuring apparatus is, in general, based on common logarithms a prior equalizer requires measurement results based on a linear scale. Further, in a prior art device, the delay characteristic obtained from a measuring apparatus must be converted to a phase characteristic. Further, according to a prior equalizer, Discrete Fourier Transform is not actually applied to an automatic equalizer since a residual ripple characteristic, the so-called Gibbs phenomenon, remains in the equalizer characteristic.

On the other hand, the Japanese patent application No. 51-70335 (U.S. Pat. No. 4,125,899) proposed a solution to the above shortcoming concerning the equalization of delay characteristic. However, said newly developed art still has problems with respect to effective use of tap length of a transversal filter depending upon a transmission line to be equalized, since said art utilizes an arrangement of multiple transversal filters connected serially to one another.

SUMMARY OF THE INVENTION

It is an object, therefore, of the present invention to overcome the disadvantages and limitations of a prior automatic equalizer using a transversal filter, by providing a new and improved automatic equalizer.

It is also an object of the present invention to provide an automatic equalization system utilizing a transversal filter effective for both amplitude equalization and delay equalization.

The present invention is different from a prior art device which employs Discrete Fourier Transform in that the amplitude equalization operates on the common logarithmic scale, and therefore, is in comformity with the assessment of the equalization performance generally performed on the logarithmic scale, and the ripple characteristic is suppressed. Also, the present invention does not use the phase characteristic for delay equalization, thus, the configuration of the present apparatus can be made small.

The present transversal type automatic equalizer comprises a transversal filter having a plurality of taps separated by time delay intervals, said transversal filter receiving input signals from a transmission line, a plurality of potentiometers being connected to each of said taps to provide a tap weight and the outputs of the potentiometers being summed up to provide an equalized output signal, means for measuring the amplitude characteristic on a logarithmic scale, and the delay characteristic of a transmission line, means for providing the inverse characteristic of the measured characteristics, a memory storing the elements of predetermined matrices, a multiplier for providing the product of the inverse characteristics and the outputs of said memory to provide a series of cosine equalization components of the amplitude characteristic and the delay characteristic, a Modified Bessel function generator for providing a discrete time sequence signals in accordance with said cosine equalization components of the amplitude characteristic, a Bessel function generator for providing discrete time sequence signals in accordance with said cosine equalization components of the delay characteristic, means for performing a convolution integration to the output of said modified Bessel function generator, to provide the result (A), means for performing a convolution integration to the output of said Bessel function generator to provide the result (B), means for performing a convolution integration between said results (A) and (B), and means for applying the result of the last convolution integration to said potentiometers to adjust the tap weight of the transversal filter.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a block-diagram of a transmission system according to the present invention, FIG. 2 is the explanatory drawing of the logarithmic cosine characteristics.

DESCRIPTION OF THE PREFERRED EMBODIMENT

Figure 3:
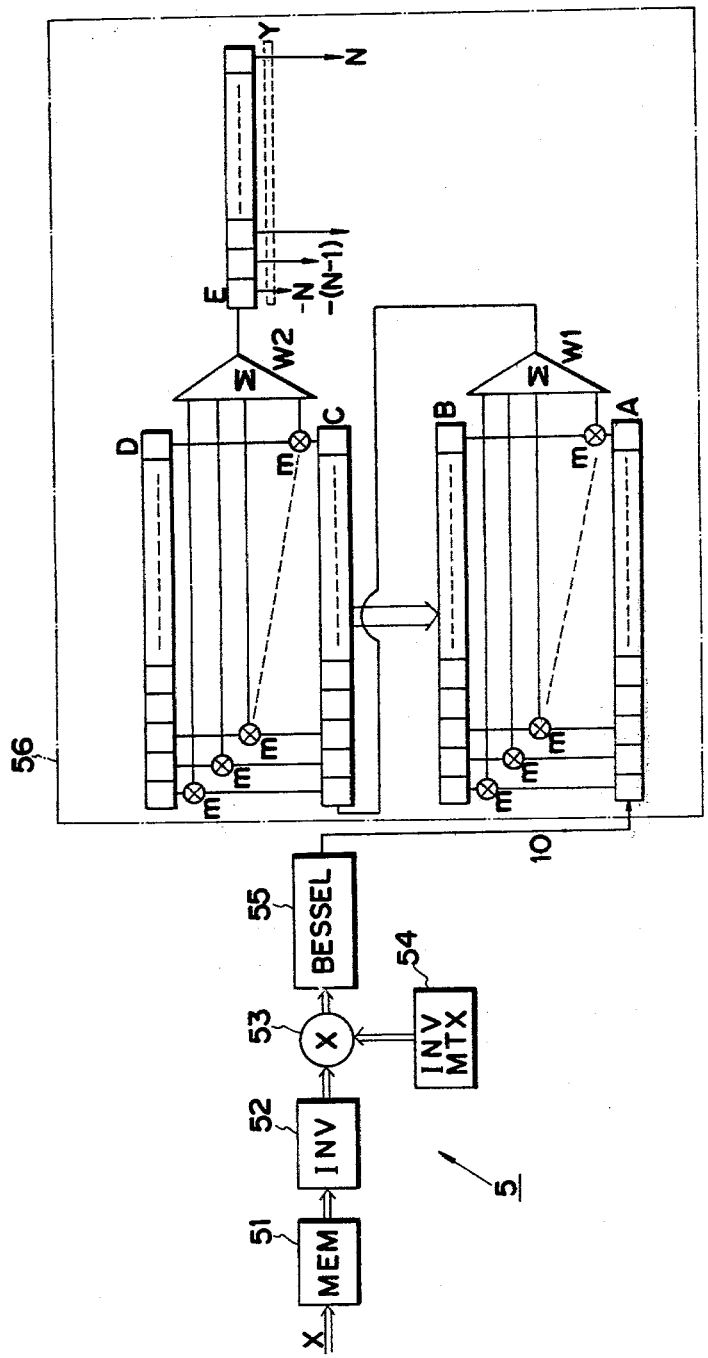
FIG. 3 is a block-diagram of the equalization arithmetic unit according to the present invention.

FIG. 1 illustrates a schematic diagram of the data transmission system according to the present invention. In the figure, the reference numeral 1 is a test signal transmitter, 2 is a transmitter for forwarding data, 3 is a transmission line, 4 is a test signal receiver, 5 is an equalization arithmetic unit, 6 is a typewriter for recording the process of the equalization, 7 is a transversal filter, 8 is a data receiver. If there were no equalization system, the transmitter 2 would be directly connected to the receiver 8 through the transmission line 3. However, in an actual system, a transversal filter 7 is provided in front of the receiver 8 in order to equalize the characteristics of the transmission line 3, and the weight of taps of the transversal filter 7 are adjusted by the adjustment arrangement having the test signal transmitter 1, the test signal receiver 4, the equalization arithmetic unit 5, and the typewriter 6.

The transversal filter 7 has a series of delay elements (7a, 7b, 7c, ... 7n). The delay time (T=$\tau$) of each delay element is $T=1/(2w)$, where w is the bandwidth of the transmission line 3. The potentiometers (7a', 7b', 7c', ...) are connected to the taps of the delay elements, and the outputs of all the potentiometers are added by the adder(ADD), which provides the equalized output of the transversal filter to the receiver 8. The adjustment of each potentiometer, or the adjustment of the tap weight of the transversal filter is automatically performed by the equalization arithmetic unit 5 according to the present invention.

In FIG. 1, the switches $SW_1$ and $SW_2$ are initially connected to the contacts (a), and the test signal from the test signal transmitter 1 is applied to the test signal receiver 4 through the transmission line 3, and the test signal receiver 4 measures the amplitude and delay characteristics of the transmission line 3.

The equalization arithmetic unit 5 performs the equalization computation based upon the result of the measurement by the test signal receiver 4, and then, the tap gains or the tap weights of the transversal filter 7 are adjusted through adjustment of the potentiometers (7a', 7b', 7c', ...) in accordance with the result of the computation. When equalization of the transmission line 3 is completed, the switches $SW_1$ and $SW_2$ are connected to the contacts (b). Therefore, the signals from the transmitter 2 are applied to the receiver 8 through the transmission line 3 and the transversal filter 7 which completed adjustment for equalization of the transmission line 3. Thus, commercial communications are performed between the transmitter 2 and the receiver 8. The important features of the present invention lie in the equalization arithmetic unit 5.

FIG. 2 illustrates the cosine characteristic resulting from the linear and logarithmic scales. In FIG. 2, the horizontal axis shows frequency, and the vertical axis shows the common logarithmic dimension. The curve (a) is the cosine characteristic on the linear scale. However, said curve is deformed on the common logarithmic scale as shown in FIG. 2, and so said curve cannot be utilized as a component of an equalizer. The curve (b) is an ideal cosine characteristic on the common logarithmic scale, and is drawn for the comparison with the curve (a). Thus, the difference between the curves (a) and (b) is identified to be an error, or distortion.

The important feature of the present invention is the method of addition of each amplitude equalization component which has the exact cosine characteristic, therefMthe exact cosine characteristic is obtained on the common logarithmic scale.

Supposing that the amplitude characteristic represented by common logarithms is $B(\omega)dB$, and this characteristic is expressed as the sum of the cosine equalization components on the common logarithmic scale as shown below.

$$B(\omega) = \sum_{k=0}^{N-1} x_k \cos(k\omega\tau) \quad (1)$$

where $x_k$ is the amplitude of each component having dimension in dB. In the formula (1), when $\omega = K\Omega$ and $B(\omega)$ is given a discrete value $B(k\Omega)=B_k$, and the inversion is taken;

$$\underline{x} = [c]^{-1}\underline{B} \quad (2)$$

In the formula (2), x and B are column vectors, and [c] represents the square matrix as set out in the following.

$$[c] = \begin{bmatrix} 1 & 1 & \cdots & 1 \\ 1 & \cos\theta & \cdots & \cos(N-1)\theta \\ \vdots & \vdots & & \vdots \\ 1 & \cos(N-1)\theta & \cdots & \cos(N-1)^2\theta \end{bmatrix} \quad (3)$$

where $\theta = \Omega\tau$.

The amplitude of each cosine equalization component required to give $B(\omega)$ is obtained from the formula (2). The cosine equalization component provided with these amplitudes can be realized as follows.

The k'th cosine equalization component $B_k(\omega)$ is drawn from the right side of the formula (1), and supposing that the transfer function on its linear scale is $g_k(\omega)$, then the following formulae are obtained.

$$B(\omega) = \sum_{k=1}^{N-1} B_k(\omega) \quad (4a)$$

$$B_k(\omega) = 20\log_{10} g_k(\omega) \quad (4b)$$

$$20\log_{10} g_k(\omega) = x_k \cos(k\omega\tau) - a_k \quad (4c)$$

provided that $a_k$ is a bias term for fixing the center tap of the transversal filter to be 1 (unit) as explained later. The equation (4c) is solved with $g_k(\omega)$;

$$g_k(\omega) = 10^{\{x_k\cos(k\omega\tau) - a_k\}/20} \quad (5a)$$

And from the formula (5a), the formula (5b) is obtained.

$$g_k(\omega) = 10^{-\frac{a_k}{20}} \cdot e^{\frac{x_k}{20} \cos(k\omega\tau) \cdot \log_e 10} \quad (5b)$$

Then, the formula (5b) is expanded through the modified Bessel function assuming that $z_k = x_k/20 \cdot \log_e 10$ $$g_k(\omega) = 10^{-\frac{a_k}{20}} \left[ I_0(z_k) + \sum_{i=1}^{\infty} I_i(z_k)\{e^{j(ik\omega\tau)} + e^{-j(ik\omega\tau)}\} \right] \quad (6)$$
$$(i = 1, 2, ...)$$

where $I_0(z_k)$, $I_i(z_k)$, ... are Modified Bessel functions. In order to make the center tap of the transversal filter to be 1, the value $a_k$ in the formula (6) is chosen as follows.

$$a_k = 20\log_{10} I_0(z_k) \quad (7)$$

Then, the formula (5b) is shown below.

$$g_k(\omega) = \frac{1}{I_0(z_k)} \cdot e^{z_k \cos(k\omega\tau)} \quad (8)$$

The coefficients $\rho_1(z_k)$, $\rho_2(z_k)$... which are obtained by expanding the formula (8) to Modified Bessel Function are;

$$\rho_1(z_k) = I_1(z_k)/I_0(z_k),$$

$$\rho_2(z_k) = I_2(Z_k)/I_0(z_k).$$

The $g_k(\omega)$ in the formula (8) can be realized by a transversal filter with positive-pair tap weight, in which the tap weight of the center tap is 1, and the tap weight for every k'th tap is the above value.

In accordance with the above method, not only the k'th cosine equalization component, but also $(N-1)$ number of components are realized by the respective independent transversal filters, and when those transversal filters are connected serially, the entire transfer function concerning the amplitude becomes as follows.

$$g(\omega) = \prod_{k=1}^{N-1} \frac{1}{I_o(z_k)} e^{\sum_{k=1}^{N-1} z_k \cos(k\omega\tau)} \qquad (9)$$

The formula (9) provides the transfer function of the $(N-1)$ number of transversal filters connected serially to one another. However, since the hardware for those transversal filters is too large, the following reduction or simplification is performed.

Concerning the k'th component $g_k(\omega)$ in the formula (6), said component $g_k(\omega)$ is converted as shown in the formula (10) by introducing the relationship of the formula (7) which is the condition for making the center tap weight 1 (unit).

$$g_k(\omega) = \sum_{l=-\infty}^{\infty} p_l(z_k) e^{-jkl\omega\tau} \qquad (10)$$

provided that $$p_o(z_k) = 1, \ p_o(z_k) = p_{-l}(z_k), \ p_l(z_k) = I_l(z_k)/I_o(z_k).$$

The formula (10) is expressed as follows on the time axis through Fourier conversion;

$$G_k(t) = \sum_{l=-\infty}^{\infty} p_l(z_k) \cdot \delta(t - kl\tau) \qquad (11)$$

The whole transfer function $g(\omega)$ concerning the amplitude is expressed $$g(\omega) = \prod_{k=1}^{N-1} g_k(\omega)$$

and that relationship is expressed as follows on the time axis through convolution integration.

$$R(n\tau) = \qquad (12)$$

$$\sum_{l_{N-1}=-\infty}^{\infty} \cdots \sum_{l_3=-\infty}^{\infty} \sum_{l_2=-\infty}^{\infty} [G_{N-1}\{(N-1)l_{N-1}\tau\} \ldots$$
$$\ldots G_2(2l_2\tau)G_1\{(n - l_{N-1} - \ldots - l_3 - l_2)\tau\}]$$
$$(n, l_2, l_3 \ldots l_{N-1}; \text{integer variables})$$

Next, the theory of the delay equalization according to the present invention will be explained.

The whole transfer function is defined as follows in case of delay equalization $$h(j\omega) = e^{-j\{\sum_{k=1}^{N-1} y_k \sin(k\omega\tau)\}} \qquad (13a)$$

where $y_k$ is the amplitude of each equalization component. Then, the delay characteristic is shown below.

$$T(\omega) = \sum_{k=1}^{N-1} k y_k \tau \cos(k\omega\tau) \qquad (13b)$$

If $T(\omega)$ is to be obtained as a discrete value $T(k\omega)=T_k$, the inversion of the formula (13b) is shown below.

$$\underline{y} = [TAU][C]^{-1}\underline{T} \qquad (14)$$

where [c] is already defined by the formula (3), and [TAU] is given below.

$$[TAU] = \begin{bmatrix} 1/\tau & & 0 \\ & 1/\tau \ddots & \\ 0 & & 1/\{(N-1)\tau\} \end{bmatrix} \qquad (15)$$

When extracting the k'th component $h_k(j\omega)$ from the formula (13a), said component can be converted as follows;

$$h_k(j\omega) = \sum_{n=-\infty}^{\infty} J_n(y_k) e^{-jnk\omega\tau} \qquad (16a)$$

$$h_k(j\omega) = J_0(y_k) + \sum_{n=1}^{\infty} J_{2n}(y_k) e^{-j(2nk\omega\tau)} + \sum_{n=1}^{\infty} J_{2n}(y_k) e^{j(2nk\omega\tau)} +$$
$$\sum_{n=1}^{\infty} J_{2n-1}(y_k) e^{-j(2n-1)k\omega\tau} - \sum_{n=1}^{\infty} J_{2n-1}(y_k) e^{j(2n-1)k\omega\tau} \qquad (16b)$$

where $J_n(y_k)$ is a Bessel function.

The formula (16b) shows that the transversal filter having the center tap weight $J_0(y_k)$, the positive-pairs tap weight $J_{2n}(y_k)$ for each 2nk'th taps from the center tap in both the right and left direction, and the negative tap weight $\pm J_{2n-1}(y_k)$ for each $(2n-1)$'th taps from the center tap, can realize the transfer function of the formula (16b).

Although the k'th equalization component is explained, the same can be achieved with respect to other components through the same theory.

When those transversal filters are connected serially, one consolidated transversal filter can be obtained through convolution integration as mentioned earlier. The transfer function in this case is shown in the formula (13a), and the tap weight is shown in the formula (18) using the relationship shown in the formula (17), in a similar form as the formula (12).

$$H_k(t) = \sum_{n=-\infty}^{\infty} J_n(y_k)\delta(t - kn\tau) \qquad (17)$$

$$S(n\tau) = \qquad (18)$$

$$\sum_{l_{N-1}=-\infty}^{\infty} \cdots \sum_{l_3=-\infty}^{\infty} \sum_{l_2=-\infty}^{\infty} [H_{N-1}\{(N-1)l_{N-1}\tau\} \ldots$$
$$\ldots H_2(2l_2\tau)H_1\{(n - l_{N-1} - \ldots - l_3 - l_2)\tau\}]$$
$$(n, l_2, l_3 \ldots l_{N-1}; \text{integer variables})$$

The formulae (12) and (18) provide the tap weights for amplitude and delay equalization, respectively. The present invention consolidates the amplitude and delay equalization into a single equalizer through convolution integration of each function. Accordingly, the consolidated tap weight is shown in the formula (19), and the transfer function in that case is derived from the formulae (9) and (13a) and is shown in the formula (20).

$$Tap,(n\tau) = \sum_{l=-\infty}^{\infty} R(l\tau)S\{(n - l)\tau\} \quad (19)$$

$$K(j\omega) = \left(\prod_{l=1}^{N-1} \frac{1}{I_o(z_l)}\right) \exp\left[\{\sum_{k=1}^{N-1} z_k \cos(k\omega\tau)\} - j\{\sum_{k=1}^{N-1} y_k \sin(k\omega\tau)\}\right] \quad (20)$$

$$(k = 1, 2, \ldots, N - 1)$$

FIG. 3 shows the detailed block-diagram of the equalization arithmetic unit 5 according to the present invention, and said unit 5 performs the computation of the tap weight of the transversal filter 7 according to the theory described above.

Figure 4A:
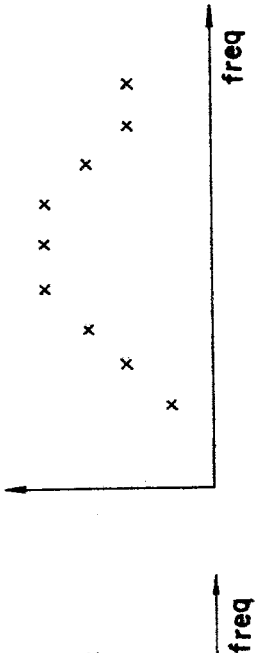
FIG. 4(A), and FIG. 4(B) are explanatory drawings of the operation of the inverse characteristic converter.
Figure 4B:
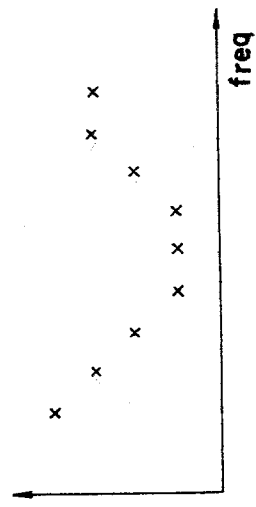

The test signal receiver 4 (FIG. 1) provides the measured result X concerning the charcteristics of the transmission line to the memory 51. The content of the memory 51 is converted to an inverted characteristic by the inverted characteristic converter 52. FIGS. 4(A) and 4(B) show the relationship between the measured characteristic of the transmission line and the inverted characteristic. Supposing that the measured characteristic of the transmission line is shown in FIG. 4(A), then the inverted characteristic of the same is shown in FIG. 4(B). Thus, when the equalizer has the inverted characteristic shown in FIG. 4(B), the total characteristic of the transmission line and equalizer becomes flat, and the distortion generated in the transmission line is cancelled. It should be appreciated in FIGS. 4(A) and 4(B) that the horizontal axis shows frequency, and the vertical axis shows amplitude characteristics in a common logarithmic scale (dB) or the delay characteristics.

The inverted characteristic converter 52 can be implemented by a simple subtractor. The inverted characteristic in amplitude corresponds to $\underline{B}$ in the formula (2), and the inverted characteristic in delay corresponds to $\underline{T}$ in the formula (14).

The multiplier 53 computes the product of the output of the inverse characteristic converter 52 and the inverse matrix is stored in the memory 54. The memory 54 stores the inverse matrix of the matrix [C] in the formula (3) in case of the amplitude equalization. And, in case of the delay equalization, the inverse matrix stored in the memory 54 is $[TAU][C]^{-1}$. Since all the elements in those inverse matrices are constant, the matrices can be implemented by memory such as read-only-memory (ROM). The output of the multiplier 53 is the result of cosine expansion of the inverse amplitude characteristic and/or delay characteristic, and corresponds to $\underline{x}$ in the formula (2) (amplitude equalization) and to $\underline{y}$ in the formula (14) (delay equalization).

Based upon the output of the multiplier 53, the function generator 55 generates a modified Bessel function for amplitude equalizaton, that is $\rho_l(z_k)$, $z_k=(x_k/20)\log_e 10$ in the formula (10), and also generates the Bessel function for the delay equalization, that is $J_n(y_k)$ in the formula (17). The structure of the Bessel function generator will be described later.

The convolution integrator 56 performs convolution integration in accordance with the formulae (12), (18) and (19) using the generated modified Bessel function series and the Bessel function series, provides the tap weight or the tap gain Y to the transversal filter 7 (FIG. 1).

First, concerning the amplitude equalization, the first time series signal $G_1(l\tau)$ is applied to the shift register A in time sequence through the line 10. At this time it is assumed that the shift register B is initialized so that the most extreme left bit of the same has the value "1" and all other bits of the same have the value "0." The contents of the registers A and B are multiplied by the multipliers (m) at every interval, and the products are applied to the added $W_1$, the output of which is applied to the shift register C.

When the first time series $G_1(l\tau)$ has been put into the shift register A, the content of the shift register C is $G_1(l\tau)$ through the convolution integration. Next, the content of the shift register C is transferred to the shift register B, and the second time series $G_2(l\tau)$ is applied to the shift register A in time sequence, then the convolution integration between $G_1(l\tau)$ in the shift register B and $G_2(l\tau)$ in the shift register A is performed, and the result is stored in the shift register C. The content of the shift register C is transferred to the shift register B again, and the shift register A receives the new time sequence $G_n(l\tau)$. By continuing the above operation, the convolution integration between the shift register A and the shift register B is performed and the final result $R(n\tau)$ is obtained in the shift register C. This final result $R(n\tau)$ is transferred from the shift register C to the shift register D through a particular signal line (not shown).

The delay equalization computation is similarly performed. The time series $H_k(l\tau)$ is applied to the shift register A through the line 10, and the convolution integration between the shift register A and the shift register B is performed in accordance with the formulae (17) and (18), and the temporary result of the convolution integration is stored in the shift register C.

When the final convolution integration $S(n\tau)$, which is to be applied to the shift register C, is obtained at the output of the adder $W_1$ the convolution integration is performed between $R(n\tau)$ which is the amplitude convolution integration and is stored in the shift register D, and $S(n\tau)$ which is the delay convolution integration and is just applied to the shift register C, in accordance with the formula (19). The result, Tap $(n\tau)$ is stored in the shift register E, each digit of which provides the tap weight of the transversal filter. Accordingly, the potentiometers (7a', 7b', 7c', ...) in FIG. 1 are adjusted by the output of each digit of the shift register E.

The configuration of FIG. 3 can be simplified in a practical embodiment, and the shift registers D and E, the multipliers (m) connected to the shift register D and the adder $W_2$ can be omitted. That is to say, when the convolution integration $R(n\tau)$ for the amplitude equalization is obtained in the shift register C, that $R(n\tau)$ is transferred to the shift register B instead of transferring to the shift register D, then the convolution integration is performed between the content of the shift register B and the first time series $H_1(l\tau)$ for the delay equalizaton. Then, the convolution integration using $H_2(l\tau)$, $H_3(l\tau)$, ... is performed, and the final result, Tap($n\tau$) is obtained in the shift register C. The mathematical expression of this process is as follows;

$$Tap(n\tau) = G_1(l\tau) \otimes \ldots \otimes G_{N-1}(l\tau) \otimes H_1(l\tau) \otimes \ldots H_{N-1}(l\tau)$$

where $\otimes$ indicates a convolution integration. And that process is equivalent to the aforementioned process shown below.

$$R(n\tau) = G_1(l\tau) \otimes G_2(l\tau) \otimes \ldots \otimes G_{N-1}(l\tau)$$

$$S(n\tau) = H_1(l\tau) \otimes H_2(l\tau) \otimes \ldots \otimes H_{N-1}(l\tau)$$

$$Tap(n\tau) = R(n\tau) \otimes S(n\tau)$$

A Bessel function generator is known in the art, and is disclosed for instance in U.S. Pat. application No. 807,671, now U.S. Pat. No. 4,125,899. The gist of the same is as follows.

Generally speaking, the Bessel function is obtained from the following formula.

$$J_p(X) = \sum_{k=0}^{\infty} \frac{(-1)^k}{k!(p+k)!} \left(\frac{X}{2}\right)^{p+2k} \quad (21)$$

Further, it should be appreciated that the first and second terms of the formula (21) can provide all of the Bessel function by introducing the following asymptotic formula.

$$J_{\nu+1}(X) = \frac{2\nu}{X} J_\nu(X) - J_{\nu-1}(X) \quad (22)$$

Figure 5:
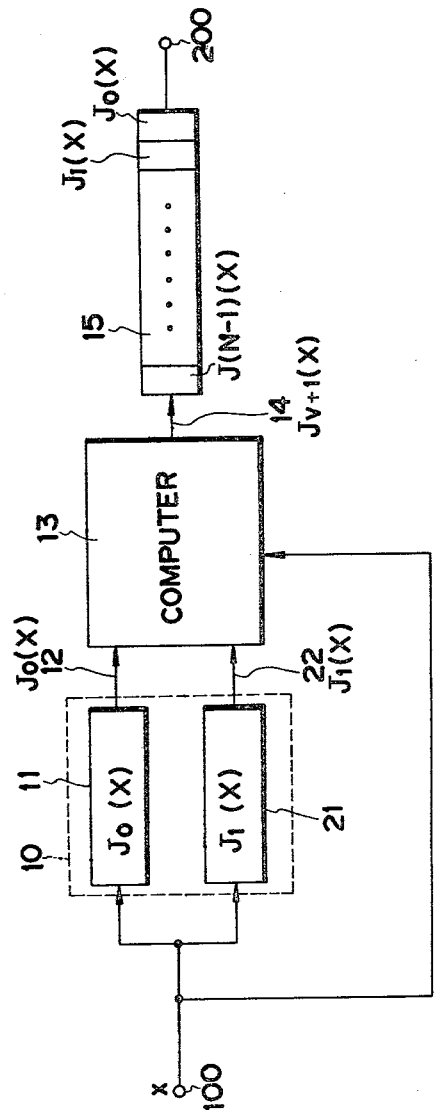
FIG. 5 is a block-diagram of a Bessel function generator.

FIG. 5 shows the block-diagram of the Bessel function generator according to the present invention. In the figure, the reference numeral 100 is the input terminal, 10 is the basic component generator for obtaining $p=0$, and $p=1$ in the formula (22), and has the box 11 for generating $J_0(X)$, and the box 12 for generating $J_1(X)$. 12 is the signal line for $J_0(X)$, 22 is the signal line for $J_1(X)$, 13 is the high-order term generator for generating $\nu=1, \nu=2, \ldots$ from the formula (22), and 14 is the signal line for $J_{\nu+1}(X)$, 15 is the shift register for storing $J_0(X), J_1(X), J_2(X), \ldots J_{(N-1)}(X)$.

Although $J_p(X)$ in the formula (12) has an infinite number of terms, the circuit 10 is sufficient to calculate a finite number of terms, however, the calculation error, is neglected, since the value of the denominator $k!(p+k)!$ increase rapidly according to the increase of the value k, and thus the terms of high-order can be neglected.

As explained above, the tap weight of a transversal filter is established using the measurement result of the amplitude characteristic on a logarithmic scale and the delay characteristic, and high speed and exact automatic equalization system with restrained ripple characteristic can be achieved.

From the foregoing it will now be apparent that a new and improved transversal type automatic equalizer has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A tranversal type automatic equalizer comprising a tranversal filter having a plurality of taps separated by time delay intervals, said transversal filter receiving input signals from a transmission line, a plurality of potentiometers being connected to each of said taps to provide a tap weight and the outputs of the potentiometers being summed up to provide an equalized output signal, means for measuring the amplitude characteristic on a logarithmic scale of the transmission line, means coupled to the measuring means for providing an inverse characteristic of said amplitude characteristic, a memory storing the elements of a predetermined matrix, a multiplier for providing the product of said inverse characteristic and the output of said memory to provide a series of cosine equalization components, a modified Bessel function generator for providing discrete time sequence signals in accordance with the output of said multiplier, means for performing a convolution integration to the output of said modified Bessel function generator, and means for applying the result of the convolution integration to said potentiometers to adjust the tap weights of the transversal filter.

2. A transversal type automatic equalizer comprising a transversal filter having a plurality of taps separated by time delay intervals, said transversal filter receiving input signals from a transmission line, a plurality of potentiometers being connected to each of said taps to provide a tap weight and the outputs of the potentiometers being summed up to provide an equalized output signal, means for measuring the delay characteristic of the transmission line, means coupled to said measuring means for providng an inverse characteristic of said measured delay characteristic, a memory storing the elements of a predetermined matrix, a multiplier for providing the product of said inverse characteristic and the output of said memory to provide a series of cosine equalization components, a Bessel function generator for providing a discrete time sequence signals in accordance with the output of said multiplier, means for performing a convolution integration to the output of said Bessel function generator, and means for applying the result of the convolution integration to said potentiometers to adjust the tap weight of the transversal filter.

3. A transversal type automatic equalizer comprising a transversal filter having a plurality of taps separated by time delay intervals, and transversal filter receiving input signals from a transmission line, a plurality of potentiometers being connected to each of said taps to provide a tap weight and the outputs of the potentiometers being summed up to provide an equalized output signal, means for measuring the amplitude characteristic on a logarithmic scale of the transmission line, means for measuring the delay characteristic of a transmission line, means coupled to the amplitude measuring means and the delay measuring means, for providing the inverse characteristic of the measured characteristics, a memory storing the elements of predetermined matrices, a multiplier for providing the product of the inverse characteristics and the outputs of said matrices to provide a series of cosine equalization components of the amplitude characteristic and the delay characteristic, a Modified Bessel function generator for providing a discrete time sequence signals in accordance with said cosine equalization components of the amplitude characteristic, a Bessel function generator for providing a discrete time sequence signals in accordance with said cosine equalization components of the delay characteristic, means for performing a convolution integration to the output of said modified Bessel function generator to provide the result (A), means for performing a convolution integration to the output of said Bessel function to provide the result (B), means for performing a convolution integration between said results (A) and (B), and means for applying the results of the last convolution integration to said potentiometers to adjust the tap weight of the transversal filter.

* * * * *